United States Patent
Barkowsky et al.

(10) Patent No.: US 10,677,251 B2
(45) Date of Patent: Jun. 9, 2020

(54) METHOD AND DEVICE FOR TESTING SAMPLES ON A TURBINE ENGINE MINIMIZING THE RISK OF SURGE BY THE EXCHANGE OF INFORMATION BETWEEN AN ENERGY MANAGER AND A SYSTEM FOR TESTING THE TURBINE ENGINE

(71) Applicants: Airbus Operations GmbH, Hamburg (DE); Airbus Operations (S.A.S.), Toulouse (FR)

(72) Inventors: Jan Barkowsky, Schwerin (DE); Paul-Emile Roux, Toulouse (FR); Laurent Duffau, Mons (FR); Thierry Garcia, Brax (FR); Charles Renard, Goyrans (FR)

(73) Assignees: Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 364 days.

(21) Appl. No.: 15/831,643

(22) Filed: Dec. 5, 2017

(65) Prior Publication Data
US 2018/0163734 A1 Jun. 14, 2018

(30) Foreign Application Priority Data
Dec. 6, 2016 (FR) ...................... 16 61991

(51) Int. Cl.
*F04D 27/00* (2006.01)
*F02C 3/04* (2006.01)
(Continued)

(52) U.S. Cl.
CPC ......... *F04D 27/001* (2013.01); *F01D 21/003* (2013.01); *F02C 3/04* (2013.01);
(Continued)

(58) Field of Classification Search
CPC . F04D 27/00; F04D 27/02; F02C 3/04; F01D 21/00; F01D 15/00
(Continued)

(56) References Cited

U.S. PATENT DOCUMENTS

| 4,606,191 A | 8/1986 | Collins et al. |
| 5,385,012 A * | 1/1995 | Rowe ........................ F02C 9/18 60/779 |

(Continued)

FOREIGN PATENT DOCUMENTS

| EP | 0980980 A2 | 2/2000 |
| EP | 2955334 A1 | 12/2015 |
| WO | WO 2016/020618 A1 | 2/2016 |

OTHER PUBLICATIONS

French Search Report for French Application No. 1661991 dated Aug. 9, 2017.

*Primary Examiner* — Tan Q Nguyen
(74) *Attorney, Agent, or Firm* — Jenkins, Wilson, Taylor & Hunt, P.A.

(57) ABSTRACT

A method for controlling takeoffs of mechanical energy and/or air on a turbine engine for the propulsion of an aircraft. It is based on a protocol for the exchange of a request/authorization between and by the energy manager and a system for controlling the turbine engine. This protocol is implemented as a result of a modification of the takeoff requirement. It is intended to check whether the surge margin is compatible with the modification of the takeoff requirement and, if the need arises, to apply temporary measures in order to prevent surge in the turbine engine, for example by providing at least a part of the energy requirements by a buffer. This permits the optimization of the operation of a turbine engine for the propulsion of an aircraft, while avoiding the risk of surge of the turbine engine.

15 Claims, 4 Drawing Sheets

(51) Int. Cl.
  *F02C 9/18* (2006.01)
  *F02C 7/32* (2006.01)
  *F01D 21/00* (2006.01)
  *F04D 15/00* (2006.01)
  *F04D 27/02* (2006.01)

(52) U.S. Cl.
  CPC ............... *F02C 7/32* (2013.01); *F02C 9/18* (2013.01); *F04D 15/0088* (2013.01); *F04D 27/0223* (2013.01); *F05D 2220/323* (2013.01); *F05D 2260/80* (2013.01); *F05D 2270/101* (2013.01)

(58) Field of Classification Search
  USPC .......................................................... 701/100
  See application file for complete search history.

(56) References Cited

U.S. PATENT DOCUMENTS

| | | |
|---|---|---|
| 8,459,038 B1 | 6/2013 | Lickfold et al. |
| 2013/0327014 A1* | 12/2013 | Moulebhar ............. F02K 3/065 60/226.2 |
| 2014/0297155 A1 | 10/2014 | Chen et al. |
| 2017/0226934 A1* | 8/2017 | Robic ....................... F02C 7/36 |

* cited by examiner

METHOD AND DEVICE FOR TESTING SAMPLES ON A TURBINE ENGINE MINIMIZING THE RISK OF SURGE BY THE EXCHANGE OF INFORMATION BETWEEN AN ENERGY MANAGER AND A SYSTEM FOR TESTING THE TURBINE ENGINE

CROSS-REFERENCE TO RELATED APPLICATION

This application claims priority to French Patent Application FR 1661991, filed Dec. 6, 2016, the entire disclosure of which is incorporated by reference herein.

TECHNICAL FIELD

The present disclosure concerns the field of turbine engines and their control. It relates, in particular, to the control of the propulsion systems equipping certain aircraft equipped with turbine engines.

BACKGROUND

It finds an application notably in turbofan engines and turboprop engines (including a non-ducted fan, generally designated by the English expressions "open rotors" or "propfans") which can be used for the propulsion of aircraft. Turboprop engines are distinguished from turbofan engines by the presence of unducted propeller blades. Turbofan engines, or "turbofans" according to the English expression, include a ducted fan acting as a propeller. The disclosure herein is applicable notably to these types of turbine engines.

Turbine engines for the propulsion of aircraft may also be designated simply by the term "engine". In the present document, the term engine thus corresponds to a turbine engine for the propulsion of an aircraft.

These turbine engines utilize one or a plurality of gas turbines recovering the energy produced in a combustion chamber supplied with air by one or a plurality of compressors.

A known phenomenon that can occur at the level of a compressor during the operation of turbine engines is the phenomenon referred to as "surge". This phenomenon is explained below by the example of a turbofan engine of an aircraft propulsion system, although it is identical in a turboprop engine (or in general in any compressor of a turbine engine).

The phenomenon of surge corresponds to aerodynamic stalling of the vanes of a compressor.

It corresponds to a tendency of the high-pressure zone of a compressor to flow back towards the low-pressure zone. This leads to instability of an oscillatory nature in the rate of flow of the compressor.

On the whole, care should be taken to prevent this phenomenon from occurring, since the variations in or the inversions of the rate of flow can cause reductions in the performance of the turbofan engine or turboprop engine.

It is thus customary to control the operation of the one (or more) compressors of a turbofan engine in order not to cause it to operate within a range of points of operation in which a surge might occur, or in proximity to this range, which is also referred to as the "surge zone". In other words, for a given rate of flow, it is necessary to satisfy oneself that the pressure ratio of the compressor (or its rate of compression) does not exceed a certain limit or, conversely, that a sufficient rate of flow is present in the compressor according to its pressure ratio or its load. In practice, there is a tendency to cause the compressor to operate at a maximum admissible pressure ratio, in order to ensure good efficiency of the turbine engine.

In the case of a turbofan engine or turboprop engine of an aircraft, the charge of the turbo compressor depends on the power supplied by the turbine engine for the propulsion of the aircraft, but also on takeoffs of mechanical power or air, for functions other than the propulsion of the aircraft.

The takeoffs may be of two kinds: mechanical, and/or of air.

Takeoff (of mechanical energy) corresponds to takeoff of power, via a mechanical transmission, at the level of a drive shaft between a turbine and a compressor. For example, this permits the generation of hydraulic power for the hydraulic equipment of the aircraft, and/or the driving of one or a plurality of generators for the supply of electrical energy.

The takeoff of air (generally designated in the aeronautical field by the English expression "bleed air") involves taking off a part of the air compressed by the compressor in order to supply, for example, the deicing systems, the air conditioning system, the cargo cooling system, the fuel inerting system, and/or the system for internal cooling of the engines.

These takeoffs impact on the margin in relation to the surge zone. A takeoff of mechanical power, generally taken on the high-pressure shaft, brings the point of operation of the compressor closer the surge zone of the turbofan engine or turboprop engine. A takeoff of air basically tends to increase the flow (mass flow of air) in the compressor, whereas the effect of the takeoffs of air on the pressure ratio is in general negligible, which moves the point of operation of the compressor away from the surge zone.

The most critical point of operation of an engine with regard to surge is at its rate (or "speed") of idling. In fact, at the lowest speed of the engine, the compressor is driven at a low speed and clearly has a low pressure ratio, but the flow of air in the compressor is also extremely reduced, so that a surge may occur at a low pressure ratio. The margin offered in terms of the pressure ratio when idling is thus very small.

A plurality of approaches are known in order to increase the distance and to ensure a certain margin between the point of operation of an aircraft engine and the surge zone. First of all, the idling of the engine may be increased, which increases the distance between the point of operation when idling and the surge zone, as explained previously. In addition, the engines may have relief valves, situated after the low-pressure compressor or the high-pressure compressor. The opening of these valves increases the flow of air in the compressor. Nevertheless, although these valves permit the thrust of the turbine engine to be maintained at a desired level, their use will involve a significant increase in consumption in order to obtain this thrust, as well as an increased risk of failure.

Another familiar approach, making it possible not to impact too negatively on the margin with regard to the surge zone, comprises or consists of a turbofan engine including a low-pressure compressor, an intermediate compressor and a high-pressure compressor, for taking off the power, via a transmission gearbox, at the level of a shaft connected to the intermediate compressor in place of a shaft connected to the high-pressure compressor, as is generally the case. This is not always possible, however, especially since many turbine engines that are used for the propulsion of aircraft do not include an intermediate shaft.

Concerning the idling, the solution generally used to define its speed involves taking into consideration the worst-case scenario, that is to say by considering the maximum mechanical takeoffs (in order to generate mechanical, electrical or hydraulic power), and minimum takeoffs of air. The definition of the idling speed also takes into account the phase of the most rapid acceleration that could follow, and during which a rapid increase in the pressure ratio takes place, while the flow does not increase instantaneously.

Thus, according to a strategy for the control of the turbine engine generally used in an aircraft, the turbine engine is controlled so that the line of operation of its compressor (defined by the succession of its points of operation), in particular high-pressure, maintains a surge margin taking into account a possible sudden acceleration of the turbine engine, the maximum level of the requirement for mechanical takeoff (even if this means setting a threshold for these requirements), and not taking into account the takeoffs of air (based on the hypothesis that these may be stopped at any moment). This leads to the adoption of a potentially high speed of idling.

Document US2014/0297155 describes a method for the management of an aircraft engine, in which the level of the mechanical takeoffs is continuously assessed in order for it to be capable of being taken into account, and is corrected (by limitation of the authorization to take off the power), in order to satisfy oneself that the engine is able to produce the necessary thrust, or remains within an admissible range of temperature. This document proposes additionally the possibility of taking into account these takeoffs in order to actuate so-called "variable geometry" devices of the engine, for example valves for guiding the air at the inlet to the compressor, or relief valves. This controlling of the means of variable geometry may be undertaken in order to take into account the margin with regard to the surge zone.

Nevertheless, the management of turbine engines, in particular as regards the takeoffs taken in the course of the operation of a turbofan engine or turboprop engine of an aircraft, may be further optimized.

SUMMARY

The disclosure herein provides, therefore, a method for controlling takeoffs of mechanical energy and/or of air on a turbine engine for the propulsion of an aircraft, the aircraft configured for taking off mechanical energy of the turbine engine in order to satisfy the requirements for the takeoff of mechanical energy, and/or approaches for taking off air in the turbine engine in order to satisfy the requirements for the takeoff of air, the aircraft including an energy manager controlling the takeoff performed on the turbine engine and a system for controlling the turbine engine controlling the operation of the turbine engine. The method includes:
following a modification of the requirements for takeoff, issuing a request for an authorization for the modification of the takeoffs by the energy manager to the system for controlling the turbine engine;
assessing by the system for controlling the turbine engine the current surge margin of the turbine engine; and
if the current surge margin permits the modification of the takeoffs without the risk of surge of the turbine engine, the issue by the system for controlling the turbine engine of an authorization for the modification of the takeoffs to the energy manager, and the modification of the takeoffs;
if the current surge margin does not permit the modification of the takeoffs without the risk of surge of the turbine engine, the modification of one or a plurality of operating parameters of the turbine engine by the system for controlling the turbine engine in order to increase the surge margin, and the application of temporary measures in response to the modification of the requirement for takeoff.

The disclosure herein developed in this way permits the optimization of the operation of a turbine engine for the propulsion of an aircraft, thanks to a the use of a communication protocol between an energy manager and a system for controlling a turbine engine of an aircraft (for example with an idle manager). This communication, according to a protocol of the request/permission type, makes it possible to prevent a modification of the takeoffs on the turbine engine as long as the latter is not at a point of operation guaranteeing the absence of surge in spite of the modification of the takeoffs (and a possible rapid acceleration of the turbine engine). During the period in which the modification of the takeoffs is not authorized, measures are adopted in order to permit the acceptable operation of the functions of the aircraft.

Thus, the surge margin in stabilized operation may be lower than that which is generally adopted, without the risk of a modification of the operation of the turbine engine generating surge. It is thus possible to cause the turbine engine to operate on a line of operation closer to the surge zone, and to adopt a lower idling speed. This is beneficial for the fuel consumption of the turbine engine and of the aircraft which is equipped therewith, for the reduction of the thrust making it possible to improve the rate of descent, to limit the wear on the brakes on the ground, and to improve the control of the aircraft on the ground by its pilot, and also for its noise emission level.

According to one embodiment of the method, the temporary measures include the supply of all or part of the requirements for takeoff of mechanical energy by a buffer permitting the storage or the production of energy.

The temporary measures may include putting into operation, or increasing the requirement for air, or preventing the stopping of components that are consumers of taken-off air.

The modification of operating parameters of the turbine engine may include increasing an idling speed of the turbine engine.

The method may additionally include:
assessing the current point of operation of the turbine engine;
assessing the current takeoff of mechanical energy;
assessing the current takeoff of air;
determining the current surge margin being a function of the current point of operation of the turbine engine, and of the current takeoff of mechanical energy and of air.

The temporary measures may include the limitation of the mechanical takeoffs by the interruption or limitation of the power of components increasing the requirement for mechanical takeoff, the components that are brought to a stop or of which the power is limited being selected according to a pre-established prioritized list of components or of functions corresponding to the components.

In one embodiment of the method, the temporary measures continue to be implemented until the receipt by the energy manager of an authorization for the modification of the takeoffs, or until the passage of a predetermined period.

In one embodiment of the method includes, if an error is detected in the progression of the method or if a malfunction prevents its application, the modification of operating parameters of the turbine engine so as to position it at a point of operation guaranteeing the absence of surge of the turbine engine for maximum takeoffs of mechanical energy and the absence of a takeoff of air.

The disclosure herein also relates to a device for controlling a turbine engine for the propulsion of an aircraft, including means for taking off mechanical energy in order to satisfy requirements for the takeoff of mechanical energy and/or means for taking off air in order to satisfy the requirements for air takeoff, and an energy manager (AEM) controlling the takeoffs on the turbine engine and a system for controlling the turbine engine controlling the operation of the turbine engine. In the device, the energy manager is configured so as to issue a request for an authorization for the modification of the takeoffs to the system for controlling the turbine engine in the case of modification of the requirements for takeoff. The system for controlling the turbine engine is configured to assess the current surge margin of the turbine engine, to issue, in response to the request for an authorization for the modification of the takeoffs, an authorization for the modification of the takeoffs to the energy manager, if the current surge margin permits the modification of the takeoffs without the risk of surge of the turbine engine, to modify one or a plurality of operating parameters of the turbine engine in order to increase the surge margin if the current surge margin does not permit the modification of the takeoffs without the risk of surge of the turbine engine. The device for controlling takeoffs is configured to apply temporary measures in response to the modification of the requirements for takeoff if the current surge margin does not permit the modification of the takeoffs without the risk of surge of the turbine engine.

Such a device may additionally include a buffer permitting the storage or the production of energy, and the supply of all or part of the requirements for the takeoff of mechanical energy as temporary measures.

The buffer may include an electrical battery or a supercapacitor. The buffer may include a hydraulic pressure reserve. The buffer may include an auxiliary power unit.

The energy manager may be configured to bring into operation, or to increase the requirement for air, or to prevent the stopping of components that are consumers of taken-off air in order to maximize the takeoffs of air in response as temporary measures.

The system for controlling the turbine engine may additionally include an idle manager, configured in order to increase the idling of the turbine engine as a modification of operating parameters of the turbine engine.

BRIEF DESCRIPTION OF THE DRAWINGS

Other features and advantages of the disclosure herein will become more evident in the description below.

In the accompanying drawings, which are given by way of non-exhaustive example.

DETAILED DESCRIPTION

Figure 1:
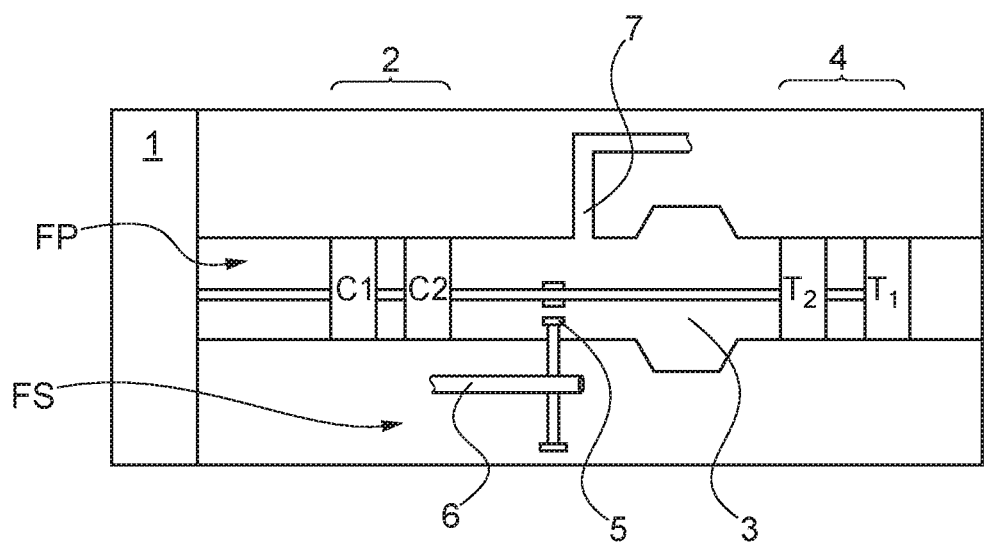
FIG. 1 represents schematically a turbofan engine of a propulsion system of an aircraft and its environment.

FIG. 1 represents in a schematic view a turbofan engine for the propulsion of an aircraft and its immediate environment. A turbofan engine as represented in FIG. 1 includes a fan 1, of which the start of rotation causes the acceleration of a flow of air divided between a principal flow of air FP and a secondary flow of air FS.

The principal flow of air FP enters the turbine engine. The air of the principal flow is placed under pressure by a compressor 2, including in the represented example respectively a low-pressure compressor C1 and a high-pressure compressor C2. The air compressed by the compressor 2 is mixed with a fuel (for example kerosene) and enters into a combustion chamber 3, where the resulting mixture is ignited.

The energy released thereby is recovered in part by a turbine 4 including, in the example represented here, a high-pressure turbine T2 and a low-pressure turbine T1.

In practice, the high-pressure turbine T2 is connected mechanically (by a shaft referred to as the high-pressure shaft) to the high-pressure compressor C2 that it drives in rotation. The low-pressure turbine T1 is connected mechanically (by a shaft referred to as the low-pressure shaft) to the low-pressure compressor C1 that it drives in rotation.

The turbine also permits the driving of the fan 1.

As previously discussed, two types of takeoffs may be taken on such a turbofan engine, namely a takeoff of mechanical energy and a takeoff of air.

The takeoff of mechanical energy is performed on a shaft, for example the high-pressure shaft, via a transmission device 5 including a speed reducer, the transmission device driving a takeoff shaft 6.

The takeoff of air is performed via a bleed point, for example a bleed point 7 downstream of the high-pressure compressor (generally used when the turbine engine is idling), upstream of any injection of fuel into the air. This configuration is depicted for illustrative purposes, the bleeding of the air being performed at different points (according to the configuration of the turbine engine on the one hand, and its point of operation on the other hand), for example between different stages of a high-pressure compressor, or upstream of the latter.

Figure 2:
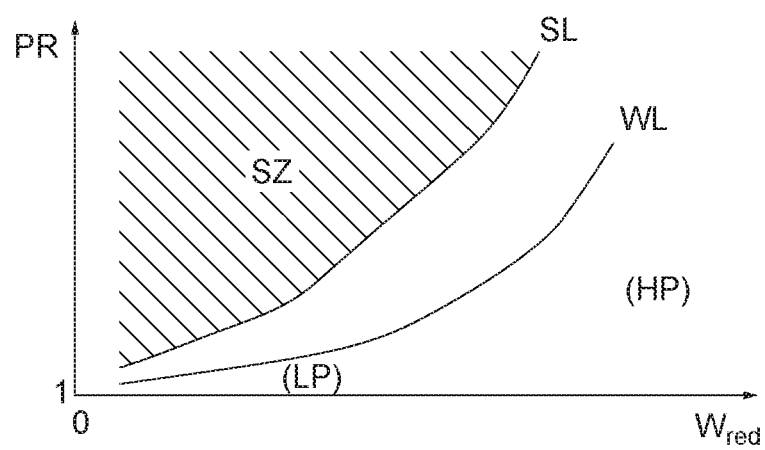
FIG. 2 illustrates in the form of a graph the operation of a compressor of a turbine engine and the notion of a surge zone.

FIG. 2 illustrates the operation of a compressor of a turbine engine, for example of the turbofan engine in FIG. 1, in the form of a graph.

Shown on the vertical axis is the pressure ratio PR of the compressor, defined as the relationship between the pressure at the outlet from and the pressure at the inlet to the compressor, and capable of being expressed by the equation:

$$PR = \frac{P_{Out}}{P_{In}},$$

in which $P_{in}$ corresponds to the total pressure at the inlet to the compressor, and $P_{out}$ is the total pressure at the outlet from the compressor.

Shown on the horizontal axis is the corrected mass flow $W_{red}$, that is to say normalized by taking into consideration the inlet pressure and the inlet temperature of the air in the compressor. The corrected mass flow is expressed by the equation:

$$W_{red} = W_{in} \cdot \frac{\sqrt{\frac{T_{in}}{T_{ref}}}}{\frac{P_{in}}{P_{ref}}}$$

in which $W_{in}$ corresponds to the mass flow at the inlet to the compressor, $T_{in}$ corresponds to the total inlet temperature, $T_{ref}$ to a reference temperature and $P_{ref}$ to a reference pressure.

The different points of operation of the compressor may thus be plotted on the graph in FIG. 2. In this graph, it is possible to define a zone known as the surge zone SZ, corresponding to all the points of operation of the compressor for which a phenomenon of surge is produced. This is produced, as illustrated in FIG. 2, when a high pressure ratio is applied to an excessively low flow of air (mass flow of air).

The surge zone (indicated by hatching) is thus delimited on the graph in FIG. 2 by a line of surge SL, corresponding to the points of "limit" operations for which a surge occurs if the pressure ratio increases or if the flow of air reduces.

In order to permit reliable operation of the turbine engine, it is controlled so that its compressor operates according to a line of operation WL that is sufficiently remote from the surge zone. The notion of distance with regard to the surge zone, also referred to as the margin or surge margin, may be expressed in a plurality of ways, for example by the margin in terms of the pressure ratio (at a constant mass flow) in relation to the surge zone, or also by the shortest distance (in the space defined by the graph) between the point of operation concerned and the line of surge SL.

Operation of the turbine engine with a low mass flow and a low pressure ratio corresponds to an operation at low power (LP), whereas operation with a high mass flow and high pressure ratio corresponds to an operation at high power (HP). As can be appreciated in FIG. 2, the line of operation WL tends to converge with the line of surge SL when the mass flow approaches zero and the pressure ratio approaches 1. The idling speed of the turbine engine is thus determined in particular so as to guarantee a certain surge margin when idling.

As illustrated in FIG. 2, there is a tendency to cause the compressor of a turbine engine to operate with a sufficient margin with regard to the surge zone SZ.

Such a margin is necessary in particular in order to avoid surge of the compressor during a rapid evolution of the takeoffs on the turbine engine, namely an increase in the mechanical takeoffs or the reduction in or the interruption of the takeoffs of air, as well as during transitional phases of operation of the turbine engine. In fact, the line of operation WL of the turbine engine represented in FIG. 2 corresponds to the points of operation at a stabilized speed. Acceleration of the turbine engine impacts on the margin with regard to the surge zone SZ, as illustrated in FIG. 3.

Figure 3:
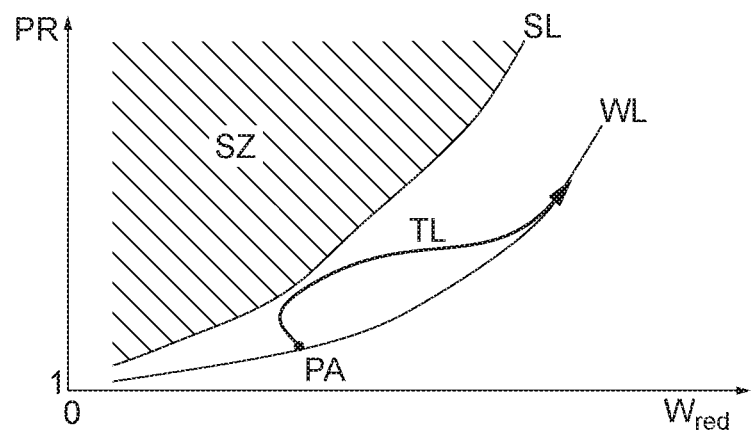
FIG. 3 illustrates in a graph similar to FIG. 2 the effect of an acceleration of the turbine engine at the points of operation of its compressor and the margin with regard to the surge zone.

FIG. 3 is essentially identical to FIG. 2, but it also depicts the transitional line of operation of the compressor TL during acceleration from a point of stabilized operation, being the so-called acceleration starting point PA.

During acceleration, the line of operation (corresponding to the succession of the effective points of operation of the compressor) tends to approach the line of surge SL, which corresponds to temporary loss of surge margin.

Thus, the fact that a turbine engine equipping an aircraft may be caused to accelerate rapidly imposes the requirement to cause it to operate, in the phases of operation at a stabilized speed, with a certain margin with regard to the surge zone in order to avoid surge during acceleration.

Figure 4:
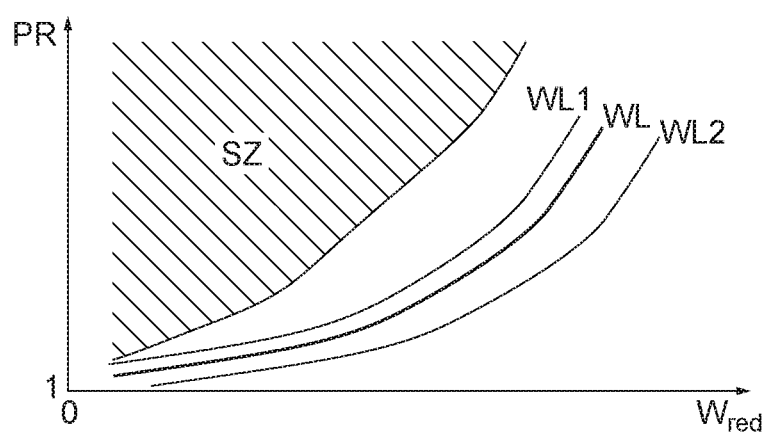
FIG. 4 illustrates on a graph similar to FIG. 2 the effect of a takeoff of mechanical energy and of a takeoff of air on the points of operation of a high-pressure compressor of a turbine engine and the margin with regard to the surge zone.

FIG. 4 illustrates on a graph similar to FIGS. 2 and 3 the effect of a takeoff of mechanical energy and of a takeoff of air on the points of operation of a compressor of a turbine engine and the margin with regard to the surge zone. FIG. 4 is essentially identical to FIG. 2, but it also depicts a line of operation of the compressor when a takeoff of mechanical energy is taken on the high-pressure shaft WL1 and a line of operation of the compressor when a takeoff of air is taken WL2.

The takeoff of air has a positive effect on the surge margin, as can be appreciated in FIG. 4. In fact, the line of operation of the compressor when a takeoff of air is taken WL2 is further away from the surge zone SZ than the line of operation WL of the compressor in the absence of any takeoff (of energy or of air). The takeoff of mechanical energy has a negative effect on the surge margin, as can be seen in FIG. 4. In fact, the line of operation of the compressor when a takeoff of energy is taken WL1 is closer to the surge zone SZ than the line of operation WL of the compressor in the absence of any takeoff (of energy or of air).

Thus, the disclosure herein tends to optimize the control of turbine engines with regard to the phenomenon of surge, in particular during their transitional operation and at a permanent speed when idling in order to avoid a definition of the idling in relation to extreme cases while guaranteeing the absence of the risk of surge.

Figure 5:
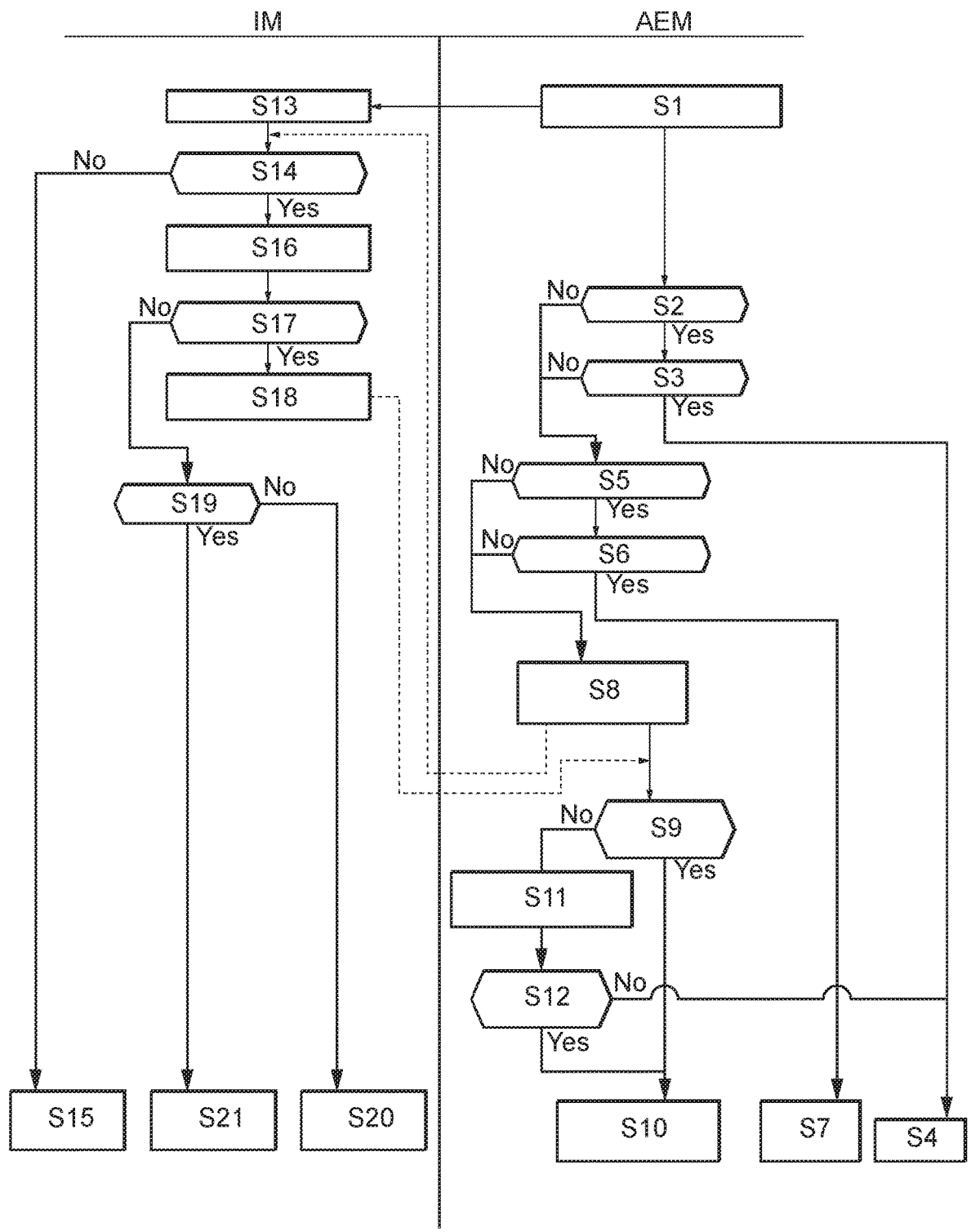
FIG. 5 illustrates in the form of a flow chart an example of a method consistent with an embodiment of the disclosure herein.

Proposed for this purpose is a method for controlling a turbine engine, of which a practical example of implementation is illustrated in FIG. 5.

FIG. 5 illustrates the control of a turbine engine such as a gas turbine for an aircraft, in particular as far as it concerns the management of the surge. Computers (capable of being discrete or constituted physically by a single computer) are used in the example in FIG. 5, on the one hand for a function of management of the energy, or energy manager referred to as AEM for "Aircraft Energy Manager", and for a function of management of the idling or idle manager, referred to as IM for "Idle Manager".

The idle manager IM is in charge of the determination of the speed of rotation of the turbine engine when idling. The energy manager AEM is in charge of controlling the requirements for takeoff, and the manner of satisfying these requirements.

In a first stage S1, the current requirements for takeoff of mechanical energy and for takeoff of air are determined. In other words, the point of operation of the machine, for example defined in a space such as the one represented by FIGS. 2 to 4, is followed, continuously or periodically (at predetermined time intervals or in response to an incident), and an assessment is made of the current takeoffs (mechanical and air) as well as the requirements for current takeoffs.

In a stage S2, an assessment is made of whether the requirement for takeoff of mechanical energy corresponds to the current takeoff of mechanical energy. Any disparity signifies the change of a parameter of operation with the potential to move the point of operation towards the surge zone, or to drive it into the surge zone of the turbine engine (that is to say of at least one compressor of the turbine engine). Similarly, an assessment is made in a stage S3 of whether the requirement for the current takeoff of the air corresponds to the current takeoff of the air.

If the response to these two tests is positive, the requirements for takeoff are satisfied, and no measure is adopted (stage S4). If this is not the case, an assessment is made of whether an indicator is activated, which requires the takeoff to be kept as low as possible (stage S5). Such an indicator may be activated, for example, in the case of requirements for particular accelerations of the turbine engine, or in the case of the selection of a so-called economical mode of operation. The energy manager AEM also assesses whether the requirement for mechanical takeoff could be reduced (stage S6), and, if these two tests are positive, the energy manager AEM orders the reduction of the takeoff of mechanical energy (stage S7). If the responses to the two tests in stages S5 and S6 are not both positive, a request for an authorization for the modification of the takeoffs of mechanical energy is sent to a system for controlling the turbine engine (physically distinct or otherwise from the aforementioned computers of the management of the idling and of the management of the energy) (stage S8).

In a stage S9, an assessment is made of whether an authorization for the modification of the takeoffs has been received by the energy manager AEM. This authorization, issued by the system for controlling the turbine engine, is a necessary prerequisite for the modification of the takeoffs applied to the turbine engine (with the exception of the case described below, in which a maximum period has elapsed, at the end of which the modification of the takeoffs is necessarily performed).

If this authorization has been issued for the change to the proposed takeoffs, which signifies that the modification of the takeoffs may be performed at the current point of operation of the turbine engine without the risk of surge, the change to the takeoff of mechanical energy and/or the takeoff of air is made, that is to say the current takeoffs are aligned with the requirements (stage S10).

If the authorization for changing the takeoffs has not been issued, which signifies that the system for controlling the turbine engine estimates that the surge margin could be affected too much (or that the turbine engine could be brought to a point of operation in the surge zone), a buffer is used to supply a part of the requirements for mechanical energy (S11). The buffer is thus used until the authorization for the modification of the takeoffs is issued or until a sufficient period guaranteeing that the turbine engine has reached a point of operation permitting the application of the required takeoffs without the risk of surge.

One of the ideas developed in the disclosure herein thus involves using the buffer for the supply of supply energy to the consumers of the aircraft during the period necessary for the engine to adapt to the requirements for power, for example by increasing its speed of idling, if the margin for surge is reduced excessively by a change in the requirements for takeoff.

With regard to the takeoffs of air, the buffer naturally formed by the cabin of the aircraft (for which one may choose to renew the air more or less rapidly within a certain limit) may be used in order to increase temporarily the takeoffs of air. Similarly, a certain delay in the change in the function of air conditioning and/or renewal of the air in the cabin is acceptable, permitting a reduction in the takeoffs of air for this function to be deferred.

The buffer is used the period when the turbine engine reaches a point of operation permitting the modification of the takeoffs without the risk of surge, including in the case of rapid acceleration of the turbine engine. In other words, the use of the buffer continues until the reception by the energy manager of an authorization for the modification of the takeoffs. Nevertheless, the use of the buffer may not be allowed to continue indefinitely and, in a stage S12, the elapse of a predefined maximum period before modification of the takeoffs is verified.

If this period is not achieved, no action is performed (stage S4). If this period is achieved or exceeded, the modification of the takeoffs is instructed, and the current takeoffs are aligned with the requirements (stage S10). In the meantime, the turbine engine will have been placed at a point of operation guaranteeing for certain any risk of surge as described below. For this purpose, it is possible in practice to implement two computers in parallel, the computer of the idle manager being of a duration shorter than the computer of the energy manager, which guarantees that the point of safe operation will be reached before the evolution of the takeoffs.

It should be noted that the issue of an authorization for the modification of the takeoffs by the system for controlling the turbine engine, and thus the assessment made at stage S9, requires knowledge of the surge margin for the current point of operation. The surge margin may be calculated, in parallel to the previously described stage sequencing, for example by the idle manager IM, in a stage of determination of the margin S13, on the basis of the information gathered at stage S1 on the current point of operation, the current takeoffs, and the requirements for takeoff.

Stage S13 and the following stages correspond to the stages undertaken (in the represented example of an embodiment) at the level of the idle manager IM in order to engage in dialogue with the energy manager AEM and, if the need arises, to modify the idling speed in order to increase the surge margin.

In a stage S14, it is determined whether a request for a change to the takeoffs has been issued (for example at stage S8).

If no request for a change to the takeoffs has been issued, no action will be ordered and the idling will remain unchanged (stage S15). If a request for a change to the takeoffs has been issued, a counter will be incremented (stage S16), permitting the verification of the good progression of the method.

Furthermore, in the case of a request for modification tending to increase the surge margin in relation to the current situation, the speed of the turbine engine may be decelerated accordingly without implementing the stages described below.

The surge margin resulting from the application of the change to the takeoffs is then compared to a threshold, for example expressed in the form of a minimum margin (stage S17). If the margin is greater than the predetermined threshold, an authorization for modification is sent to the energy management computer in a stage S18 (which, in the example of the embodiment represented here, permits the implementation of stage S9).

If the surge margin is lower than the threshold, such that a risk of surge would exist if the modification of the takeoffs were to be authorized, the idling speed of the turbine engine is accelerated (stage S20). This can be allowed to continue until the surge margin on the current point of the turbine engine is sufficient to guarantee the absence of surge in spite of the required modification of the takeoffs, and even if a sudden acceleration of the turbine engine were to be ordered.

Nevertheless, the period during which the system for controlling the turbine engine asks the aircraft not to modify the takeoffs (by the absence of an authorization to do so) cannot be indefinite. Consequently, the use of the buffer in order to supply a part of the requirement for takeoff cannot be allowed to continue indefinitely. A maximum period is thus predetermined, beyond which the system for controlling the turbine engine must authorize, necessarily, the modification of the takeoffs.

Thus, before the passage of the maximum predetermined period (controlled at stage S19) (or if an error is detected in the progression of the method or a malfunction is detected preventing the normal implementation of the method), the turbine engine is brought by default to a point of operation, to which a predefined idling speed corresponds. This default point is said to be "safe" with regard to the phenomenon of surge, in the sense that it makes it possible at the same time to satisfy the requirements for maximum mechanical takeoffs, to permit the interruption of the takeoffs of air, and to permit the maximum acceleration of the turbine engine while guaranteeing the absence of surge (stage S21). This point of safe operation with regard to surge is also used if an error of any kind is detected during the implementation of the method (for example during the determination of the surge margin), or a temporary or permanent loss of communication between the energy manager and the system for controlling the turbine engine (for example with the idle manager), so as to guarantee the absence of surge in case of uncertainty.

Such a method may be supplemented by the limitation of the mechanical takeoffs. This limitation may be achieved by the interruption or limitation of the power of components increasing the requirement for mechanical takeoff. In order to choose the affected components, a prioritized list of components or of functions corresponding to components may be established and used (preferably being the components that are less important for the smooth operation or the comfort of the aircraft being affected first of all).

Such a method may also be supplemented by management of the takeoffs of air, for example by making it possible to maintain or increase the takeoffs of air in a transitional phase of operation of the turbine engine (for example, taking advantage of the buffer with regard to storage of air offered by the cabin of the aircraft, or by dedicated storage), which increases the surge margin.

Figure 6:
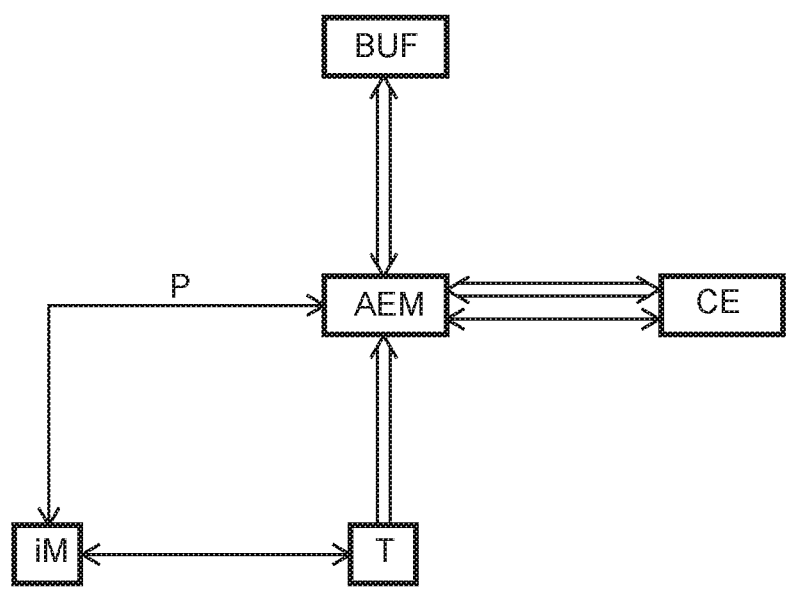
FIG. 6 illustrates schematically a device consistent with an embodiment of the disclosure herein.

FIG. 6 depicts in a schematic manner a device for controlling a turbine engine T of an aircraft, according to one embodiment of the disclosure herein. A transfer of energy or air is represented by double arrows, and a transfer of data (information, instructions) by single arrows.

The turbine engine T, which may be of the same type as that represented in FIG. 1, includes structures and methods for taking off mechanical energy and for taking off air.

The device additionally includes a buffer BUF. The buffer BUF permits the storage or the production of energy (without increasing the power of the turbine engine or generating additional thrust). The expression production of energy is intended to denote, for example, the production of electrical energy by the conversion of the chemical energy of kerosene, the buffer possibly being a generator. The buffer BUF can store electrical energy (battery, supercondenser/supercapacitor, etc.) or of hydraulic energy (such as a pressure accumulator) or mechanical energy (inertial storage of potential energy, etc.; the buffer may include an auxiliary generator (generally designated by the English acronym "APU"), which is generally used on the ground by the aircraft in order to generate electricity.

The device also includes an energy manager AEM and an idle manager IM. The energy manager AEM in particular has the function of controlling the takeoffs that are taken on the turbine engine. The idle manager IM is an element of a system for controlling the turbine engine T, which controls it and monitors its point of operation. The system for controlling the turbine engine, for example via the idle manager IM, also makes it possible to monitor the surge margin, that is to say the margin in relation to a surge zone SZ.

The energy manager AEM and the idle manager IM communicate in order to authorize or not to authorize the modification of the takeoffs on the turbine engine. This communication corresponds to the implementation of a protocol P, which may be the protocol represented in FIG. 5, for example. Thus, in response to a request for the modification of the takeoffs issued by the energy manager AEM, this modification may be authorized after having satisfied oneself that the turbine engine is at a point of operation guaranteeing the absence of surge. If the current point of operation of the turbine engine does not permit the required modification of the takeoffs, the turbine engine its idling speed is increased. During this period, at least a part of the requirements for the takeoff of mechanical energy of energy consuming elements CE, generally supplied by the takeoffs of mechanical energy alone, are assured by the buffer BUF.

The disclosure herein developed in this way permits the optimization of the operation of a turbine engine for the propulsion of an aircraft, thanks to use of a protocol of communication between an energy manager and an idle manager (or more generally a system for controlling a turbine engine of an aircraft). This communication makes it possible to prevent a modification of the takeoffs on the turbine engine for as long as the latter is not at a point of operation guaranteeing the absence of surge in spite of the modification of the takeoffs (and a possible rapid acceleration of the turbine engine). During the period for which the modification of the takeoffs is not authorized, a buffer (energy storage device or energy generator) may be used for the supply of energy in the phases of operation of the turbine engine with the potential to generate a surge phenomenon. The use of the buffer makes it possible to satisfy temporarily all or part of the energy requirement that is generally satisfied entirely by the takeoff of mechanical energy at the level of the turbine engine.

In certain variants of the disclosure herein, the takeoffs are considered in a global manner, including the takeoffs of air, which are beneficial for the surge margin.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling takeoffs of mechanical energy and/or of air on a turbine engine for propulsion of an aircraft, the aircraft configured for taking off mechanical energy of the turbine engine to satisfy requirements for the takeoff of mechanical energy, and/or configured for taking off air in the turbine engine to satisfy a requirement for taking off of air, the aircraft comprising an energy manager controlling the takeoff performed on the turbine engine and a system for controlling operation of the turbine engine, the method comprising:
  following a modification of the requirements for takeoff, issuing a request for an authorization for modification of the takeoffs by the energy manager to the system for controlling the turbine engine;
  assessing, by the system for controlling the turbine engine, a current surge margin of the turbine engine; and
  when the current surge margin permits a modification of the takeoffs without risk of surge of the turbine engine, issuing, by the system for controlling the turbine engine, an authorization for the modification of the takeoffs to the energy manager, and executing the modification of the takeoffs;
  when the current surge margin does not permit the modification of the takeoffs without the risk of surge of the turbine engine, modifying one or a plurality of operating parameters of the turbine engine by the system for controlling the turbine engine in order to increase the surge margin, and applying temporary measures in response to the modification of the requirements for takeoff.

2. The method according to claim 1, wherein the temporary measures include supply of all or part of the requirements for the taking off of mechanical energy by a buffer permitting storage or production of energy.

3. The method according to claim 1, wherein the temporary measures include putting into operation or increasing a requirement for air or preventing stopping of components that are consumers of taken off air.

4. The method according to claim 1, wherein modifying of operating parameters of the turbine engine includes increasing an idling speed of the turbine engine.

5. The method according to claim 1, further comprising:
  assessing a current point of operation of the turbine engine;
  assessing a current takeoff of mechanical energy; and
  assessing a current takeoff of air;
  wherein assessing the current surge margin is a function of the current point of operation of the turbine engine, the current takeoff of mechanical energy, and the current takeoff of air.

6. The method according to claim 1, wherein the temporary measures include a limitation of the mechanical takeoffs by interruption or limitation of power of components increasing the requirement for mechanical takeoffs, the components that are brought to a stop or of which the power is limited being selected according to a pre-established prioritized list of components or of functions corresponding to the components.

7. The method according to claim 1, wherein the temporary measures continue to be implemented until receipt by the energy manager of an authorization for modification of the takeoffs, or until passage of a predetermined period.

8. The method according to claim 1, comprising, when an error is detected in progression of the method or when a malfunction prevents application of the method, modifying operating parameters of the turbine engine to position the turbine engine at a point of operation guaranteeing an absence of surge of the turbine engine for maximum takeoffs of mechanical energy and absence of a takeoff of air.

9. A device for controlling a turbine engine for propulsion of an aircraft, the device comprising:
  an energy manager for controlling takeoffs on the turbine engine and a system for controlling the turbine engine controlling operation of the turbine engine;
  wherein:
  the device is configured for taking off mechanical energy to satisfy requirements for taking off of mechanical energy and/or configured for taking off air to satisfy requirements for air takeoff;
  the energy manager is configured to issue a request for an authorization for modification of the takeoffs to the system for controlling the turbine engine in case of modification of the requirements for takeoff;
  the system for controlling the turbine engine is configured:
    to assess current surge margin of the turbine engine;
    to issue, in response to the request for authorization for modification of the takeoffs, an authorization for modification of the takeoffs to the energy manager, if the current surge margin permits the modification of the takeoffs without risk of surge of the turbine engine; and
    to modify one or a plurality of operating parameters of the turbine engine in order to increase the current surge margin if the current surge margin does not permit modification of the takeoffs without risk of surge of the turbine engine; and
  the device for controlling the takeoffs is configured to apply temporary measures in response to the modification of the requirements for takeoff if the current surge margin does not permit the modification of the takeoffs without risk of surge of the turbine engine.

10. The device according to claim 9 further comprising a buffer permitting storage or production of energy, and supply of all or part of the requirements for takeoff of mechanical energy as temporary measures.

11. The device according to claim 10, wherein the buffer includes an electrical battery or a supercapacitor.

12. The device according to claim 10, wherein the buffer includes a hydraulic pressure reserve.

13. The device according to claim 10, wherein the buffer includes an auxiliary power unit.

14. The device according to claim 9, wherein the energy manager is configured to bring into operation, or to increase requirement for air, or to prevent stopping of components that are consumers of air taken-off to maximize the takeoffs of air in response as temporary measures.

15. The device according to claim 9, wherein the system for controlling the turbine engine comprises an idle manager configured to increase idling of the turbine engine as a modification of operating parameters of the turbine engine.

* * * * *